United States Patent
Do et al.

(10) Patent No.: US 10,558,965 B2
(45) Date of Patent: Feb. 11, 2020

(54) SECURE TOUCHSCREEN DEVICE

(71) Applicant: VeriFone, Inc., San Jose, CA (US)

(72) Inventors: Huygens Jefferson Do, El Dorado Hills, CA (US); Ricardo E. Espinoza-Ibarra, Rocklin, CA (US); John Henry Barrowman, Knoxville, TN (US)

(73) Assignee: VeriFone, Inc., San Jose, CA (US)

( * ) Notice: Subject to any disclaimer, the term of this patent is extended or adjusted under 35 U.S.C. 154(b) by 168 days.

(21) Appl. No.: 15/496,065

(22) Filed: Apr. 25, 2017

(65) Prior Publication Data
US 2018/0308083 A1    Oct. 25, 2018

(51) Int. Cl.
*G06Q 20/20* (2012.01)
*G06F 21/83* (2013.01)

(52) U.S. Cl.
CPC .......... *G06Q 20/206* (2013.01); *G06F 21/83* (2013.01)

(58) Field of Classification Search
CPC ..... G06Q 20/206; G06F 21/86; G06F 3/0416; G06F 21/83
USPC ....... 705/18, 21, 23; 345/173, 174; 257/679, 257/774
See application file for complete search history.

(56) References Cited

U.S. PATENT DOCUMENTS

| | | | |
|---|---|---|---|
| 10,218,383 B2* | 2/2019 | McNicoll | H03M 11/006 |
| 2002/0083858 A1* | 7/2002 | MacDiarmid | B41M 3/006 |
| | | | 101/484 |
| 2012/0180140 A1 | 7/2012 | Barrowman et al. | |
| 2012/0235942 A1* | 9/2012 | Shahoian | G06F 1/1616 |
| | | | 345/173 |
| 2014/0247246 A1* | 9/2014 | Maus | G06F 3/044 |
| | | | 345/174 |
| 2014/0304826 A1* | 10/2014 | Bytheway | G06F 21/86 |
| | | | 726/26 |
| 2017/0010750 A1* | 1/2017 | Hotelling | G06F 3/044 |
| 2018/0181200 A1* | 6/2018 | Olien | C09D 11/52 |

FOREIGN PATENT DOCUMENTS

| EP | 2544157 | 1/2013 |
|---|---|---|
| WO | 2009/073231 | 6/2009 |

OTHER PUBLICATIONS

European Patent Office, Communication, European Patent Application No. 18169223.7, dated Aug. 31, 2018, pp. 1-3.

* cited by examiner

*Primary Examiner* — Vanel Frenel

(74) *Attorney, Agent, or Firm* — Greenberg Traurig LLP

(57) ABSTRACT

Secure touchscreen devices are disclosed. In one embodiment, a secure touchscreen assembly may include a first patterned conductive layer comprising a first touch sensing grid and a first tamper sensing grid, the first tamper sensing grid disposed in areas of the first conductive layer where the first touch sensing grid is not present and is not in physical contact with the first touch sensing grid, and tamper sensing circuitry coupled to the first tamper sensing grid that detects a tamper by detecting change in conductivity in the first tamper sensing grid.

12 Claims, 5 Drawing Sheets

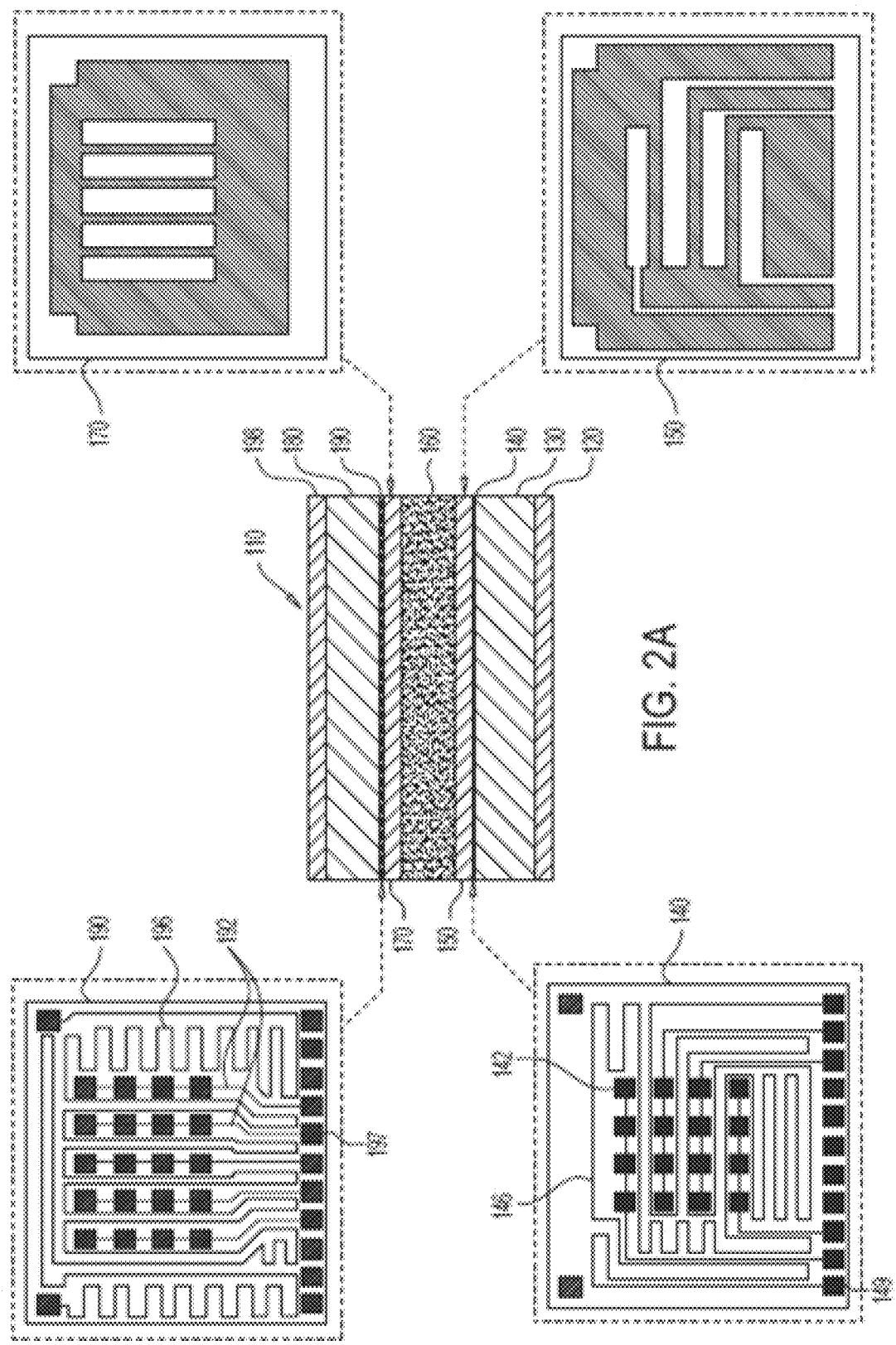

SECURE TOUCHSCREEN DEVICE

BACKGROUND OF THE INVENTION

1. Field of the Invention

The present invention relates to touch screens generally and more particularly to touch screens forming part of point of sale devices.

2. Description of the Related Art

Touch-enabled screens, or touchscreens, are commonly used in ATMs, point-of-sale (POS) devices, vending machines, etc. to facilitate interaction with a user. These devices generally include two patterned conductive layers that may be arranged to detect the location at which the touch screen was touched. The touchscreens themselves, however, present a security vulnerability as an unscrupulous individual may breech the touchscreen to gain access to the sensor arrays or to equipment that may be positioned below the touchscreen.

SUMMARY OF THE INVENTION

Secure touchscreen devices are disclosed. In one embodiment, a secure touchscreen assembly may include a first patterned conductive layer comprising a first touch sensing grid and a first tamper sensing grid, the first tamper sensing grid disposed in areas of the first conductive layer where the first touch sensing grid is not present and is not in physical contact with the first touch sensing grid, and tamper sensing circuitry coupled to the first tamper sensing grid that detects a tamper by detecting change in conductivity in the first tamper sensing grid.

In one embodiment, the secure touchscreen assembly may further include a second patterned conductive layer comprising a second touch sensing grid; and an electrically insulative layer disposed between the first patterned conductive layer and the second patterned conductive layer. The second patterned conductive layer may further include a second tamper sensing grid that is disposed in areas of the second conductive layer where the second touch sensing grid is not present and is not in physical contact with the second touch sensing grid. The tamper sensing circuitry may be further coupled to the second tamper sensing grid and may further detect the tamper by detecting a change in conductivity in the second tamper sensing grid.

In one embodiment, the secure touchscreen assembly may further include a first protective covering layer disposed between the first patterned conductive layer and the electrically insulative layer, wherein the first protective covering layer is patterned to expose the first touch sensing grid to the electrically insulative layer. It may also include a second protective covering layer disposed between the second patterned conductive layer and the electrically insulative layer, wherein the second protective covering layer is patterned to expose the second touch sensing grid to the electrically insulative layer.

In one embodiment, the secure touchscreen assembly may further include touch sensing circuitry coupled to the first touch sensing grid and the second touch sensing grid that may detect a touch by detecting a change in capacitance in the first touch sensing grid and the second touch sensing grid.

According to another embodiment, a secure touchscreen assembly may include a first patterned conductive layer comprising a first tamper sensing grid; a second patterned conductive layer comprising a first touch sensing grid; a first substrate disposed between the first patterned conductive layer and the first patterned conductive layer; and tamper sensing circuitry coupled to the first tamper sensing grid that detects a tamper by detecting a change in conductivity in the first tamper sensing grid.

In one embodiment, the secure touchscreen assembly may include a third patterned conductive layer comprising a second touch sensing grid; a fourth patterned conductive layer comprising a second tamper sensing grid; and a second substrate disposed between the third patterned conductive layer and the fourth patterned conductive layer. The tamper sensing circuitry may be further coupled to the second tamper sensing grid and further detects the tamper by detecting a change in conductivity in the second tamper sensing grid.

In one embodiment, the change in conductivity may be an open circuit, a short circuit, etc.

In one embodiment, the secure touchscreen may include touch sensing circuitry coupled to the first touch sensing grid and the second touch sensing grid that may detect a touch by detecting a change in capacitance in the first touch sensing grid and the second touch sensing grid.

According to another embodiment, a secure touchscreen assembly may include a first patterned conductive layer comprising a plurality of first traces, each first trace comprising a conductive pad at each end; a second patterned conductive layer comprising a plurality of second traces, each second trace comprising a conductive pad at each end; tamper sensing circuitry that detects a tamper by detecting a change in conductivity in one of the traces in the first patterned conductive layer and the second patterned conductive layer; touch sensing circuitry that detects a touch; and a switch that selectably electrically couples the tamper sensing circuitry to the conductive pads for at least one of plurality of first traces and second traces, or electrically couples the touch sensing circuitry to one of the conductive pads for each of the plurality of first traces and the plurality of second traces at a given time.

In one embodiment, the conductive pad for each of the plurality of first traces and the plurality of second traces that is not electrically coupled to the touch sensing circuitry floats when the switch electrically couples the touch sensing circuitry to one of the conductive pads for each of the plurality of first traces and the plurality of second traces.

In one embodiment, change in conductivity may be an open circuit, a short circuit, etc.

In one embodiment, the first patterned conductive layer may further include a first tamper sensing grid that is disposed in areas of the first conductive layer where the plurality of first traces are not present and is not in physical contact with the plurality of first traces. The touch sensing circuitry may be coupled to the first tamper sensing grid and may further detect the tamper by detecting a change in conductivity in the first tamper sensing grid.

In one embodiment, the second patterned conductive layer may further comprise a second tamper sensing grid that is disposed in areas of the second conductive layer where the plurality of second traces are not present and is not in physical contact with the plurality of second traces. The touch sensing circuitry may be coupled to the second tamper sensing grid and may further detect the tamper by detecting a change in conductivity in the second tamper sensing grid.

In one embodiment, the secure touchscreen may include an electrically insulative layer disposed between the first patterned conductive layer and the second patterned conductive layer.

According to another embodiment, in an information processing device comprising a first patterned conductive layer comprising a plurality of first traces, each first trace comprising a conductive pad at each end, a second patterned conductive layer comprising a plurality of second traces, each second trace comprising a conductive pad at each end, tamper sensing circuitry that detects a tamper by detecting a change in conductivity in one of the traces in the first patterned conductive layer and the second patterned conductive layer, touch sensing circuitry that detects a touch, a switch, and at least one computer processor, a method for combined tamper detection and touch detection may include (1) the at least one computer processor causing the switch to electrically couple the tamper sensing circuitry to the conductive pads for at least one of plurality of first traces and second traces; (2) the tamper detection circuitry monitoring the at least one of plurality of first traces and second traces coupled to the tamper sensing circuitry for a change in conductivity; (3) the at least one computer processor causing the switch to couple the touch sensing circuitry to one of the conductive pads for each of the plurality of first traces and the plurality of second traces; and (4) the touch sensing circuitry monitoring the first traces and the plurality of second traces for a touch.

In one embodiment, the change in conductivity comprises one of an open circuit and a short circuit.

In one embodiment, the method may further include the at least one computer processor executing an action in response to a change in conductivity. The action may include erasing sensitive data stored in a memory, disabling the information processing device, generating an alert, etc.

Any of the disclosed secure touchscreen assemblies may be part of a point of sale device, an automated teller machine, etc.

According to another embodiment, a secure touchscreen assembly may include at least two patterned conductive layers mutually separated by at least one electrically insulative layer, touch sensing circuitry configured to send electrical signals to at least a first of the at least two patterned conductive layers, the touch sensing circuitry being configured to receive electrical signals from at least a second of the at least two patterned conductive layers and tamper sensing circuitry configured to send electrical signals to and to receive electrical signals from at least one of the at least two patterned conductive layers.

According to another embodiment, a point of sale terminal may include a chassis, point of sale circuitry and a secure touchscreen assembly, communicating with the point of sale circuitry and may include at least two patterned conductive layers mutually separated by at least one electrically insulative layer, touch sensing circuitry configured to send electrical signals to at least a first of the at least two patterned conductive layers, the touch sensing circuitry being configured to receive electrical signals from at least a second of the at least two patterned conductive layers and tamper sensing circuitry that may be to send electrical signals to and to receive electrical signals from at least one of the at least two patterned conductive layers.

In one embodiment, the secure touchscreen assembly may include a switch that may selectably couple the at least first and second patterned conductive layers to either the touch sensing circuitry or to the tamper sensing circuitry at a given time.

In one embodiment, at least one of the at least first and second patterned conductive layers may include both a touch sensing grid, coupled to the touch sensing circuitry, and a tamper sensing grid, coupled to the tamper sensing circuitry. Additionally, the touch sensing grid may be electrically insulated from the tamper sensing grid.

In one embodiment, at least two of the at least first and second patterned conductive layers each may include both a touch sensing grid, coupled to the touch sensing circuitry, and a tamper sensing grid, coupled to the tamper sensing circuitry. Additionally, the touch sensing grid may be electrically insulated from the tamper sensing grid.

In one embodiment, the at least first and second patterned conductive layers include first, second, third and fourth patterned conductive layers, the first and second patterned conductive layers may each include a touch sensing grid, coupled to the touch sensing circuitry, and the third and fourth patterned conductive layers each including a tamper sensing grid, coupled to the tamper sensing circuitry. Additionally, the touch sensing grids may be electrically insulated from the tamper sensing grids.

In another embodiment, a point of sale terminal may include a chassis, point of sale circuitry and a secure touchscreen assembly, communicating with the point of sale circuitry and including at least two patterned conductive layers mutually separated by at least one electrically insulative layer, touch sensing circuitry configured to send electrical signals to at least a first of the at least two patterned conductive layers, the touch sensing circuitry being configured to receive electrical signals from at least a second of the at least two patterned conductive layers and tamper sensing circuitry configured to send electrical signals to and to receive electrical signals from at least one of the at least two patterned conductive layers, at least one of the at least first and second patterned conductive layers including both a touch sensing grid, coupled to the touch sensing circuitry, and a tamper sensing grid, coupled to the tamper sensing circuitry.

In another embodiment, a point of sale terminal may include a chassis, point of sale circuitry and a secure touchscreen assembly, communicating with the point of sale circuitry and including at least two patterned conductive layers mutually separated by at least one electrically insulative layer, touch sensing circuitry configured to send electrical signals to at least a first of the at least two patterned conductive layers, the touch sensing circuitry being configured to receive electrical signals from at least a second of the at least two patterned conductive layers and tamper sensing circuitry configured to send electrical signals to and to receive electrical signals from at least one of the at least two patterned conductive layers, the at least two patterned conductive layers including first, second, third and fourth patterned conductive layers, the first and second patterned conductive layers each including a touch sensing grid, coupled to the touch sensing circuitry, and the third and fourth patterned conductive layers each including a tamper sensing grid, coupled to the tamper sensing circuitry.

In one embodiment, the touch sensing grids may be electrically insulated from the tamper sensing grids.

BRIEF DESCRIPTION OF THE DRAWINGS

The present invention will be understood and appreciated more fully from the following detailed description, taken in conjunction with the drawings in which:

FIG. 2A is a simplified, partially sectional, partially planar, illustration of one embodiment of a secure touchscreen of the general type illustrated in FIG. 1;

DETAILED DESCRIPTION OF PREFERRED EMBODIMENTS

Figure 1:
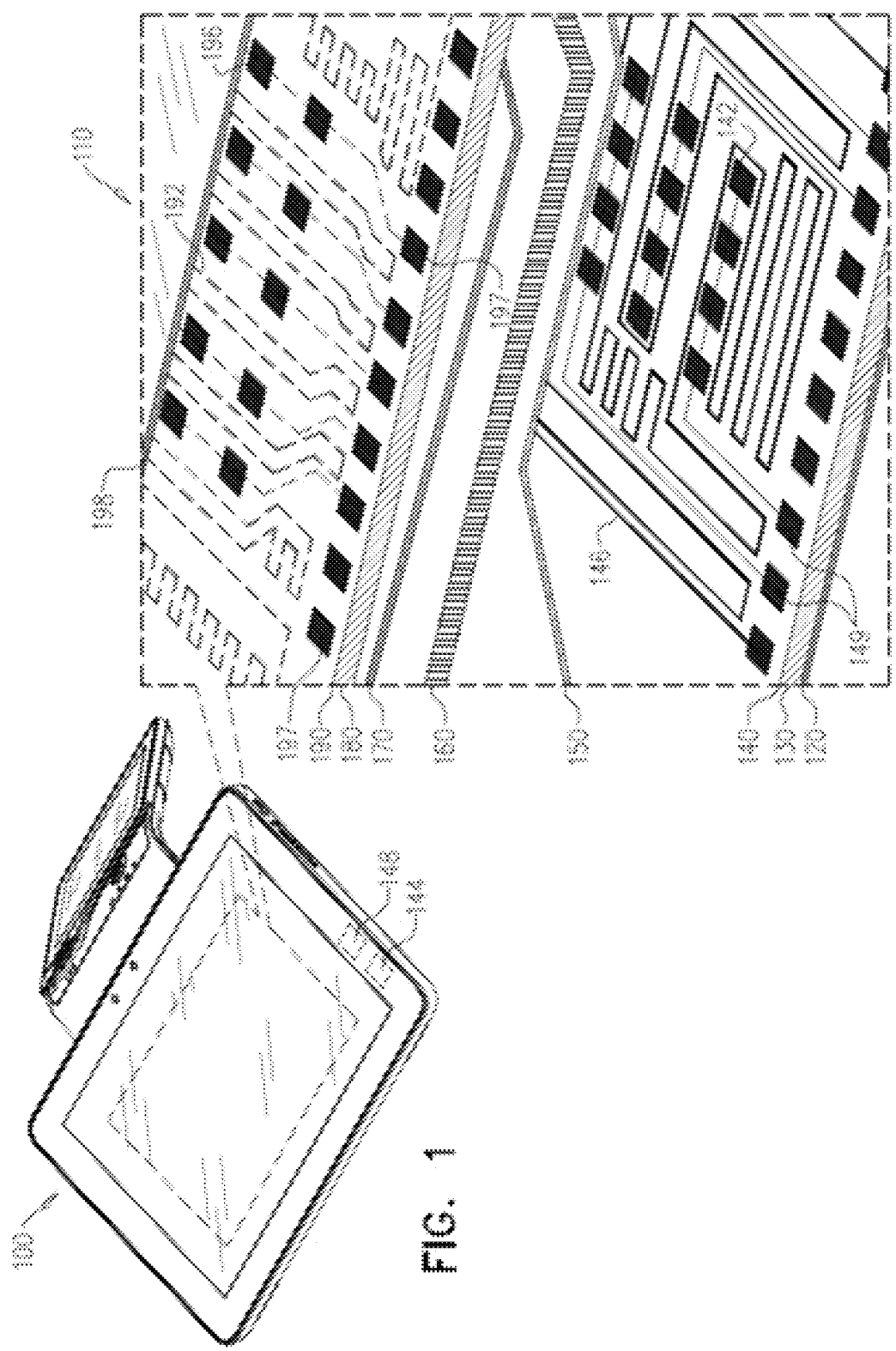
FIG. 1 is a simplified illustration of a point of sale device including a secure touchscreen constructed and operative in accordance with a preferred embodiment of the present invention.

Reference is now made to FIG. 1, which is a simplified illustration of a point of sale device including a secure touchscreen constructed and operative in accordance with a preferred embodiment of the present invention.

As seen in FIG. 1, there is provided a point of sale device 100, commercially available from Verifone, Inc. point of sale device 100, which alternatively may be any other suitable point of sale device, includes, inter alia, a secure touch screen assembly 110, constructed and operative in accordance with preferred embodiments.

Although embodiments may be disclosed in the context of a point of sale device, it should be recognize that the embodiments are not so limited. The disclosed secure touchscreen assemblies may be used with a variety of other devices.

In one embodiment, point of sale device 110 may include a host computer processor (not shown). In one embodiment, host computer processor may be any suitable processing machine that executes the instructions that may be stored in internal and/or external memory or memories to process data. It may include general purpose computer processors, specialized computer processors, integrated circuits, programmed microprocessors, micro-controllers, peripheral integrated circuit elements, a CSIC (Customer Specific Integrated Circuit), ASIC (Application Specific Integrated Circuit), other integrated circuits, digital signal processors, programmable logic devices such as a FPGA, PLD, PLA or PAL, or any other suitable device or arrangement of devices.

Secure touch screen assembly 110 preferably comprises an optional bottom protective covering layer 120. Disposed above bottom protective covering layer 120 is a bottom substrate 130. Preferably formed onto an upper surface of bottom substrate 130 is a patterned conductive layer 140, preferably formed of Indium Tin Oxide (ITO), but alternatively formed of any other suitable material.

Preferably, the patterned conductive layer 140 includes, as shown in FIG. 1, both a touch sensing grid 142, electrically coupled to touch sensing circuitry 144, and a tamper sensing grid 146, coupled to tamper sensing circuitry 148. The touch sensing grid 142 and the tamper sensing grid 146 preferably do not physically contact each other. In various alternative embodiments, some of which described herein below with reference to FIGS. 2A, 2B and 2C, the patterned conductive layer 140 may include only a single grid. The patterned conductive layer 140 is preferably coupled to touch sensing circuitry 144 and to tamper sensing circuitry 148 via conductive pads 149, some of which may also function, together with similar conductive pads on other patterned conductive layers on other substrates, as case-open switches, which may also be electrically coupled to tamper sensing circuitry 148.

Preferably, touch sensing circuitry 144 is configured to send electrical signals to and/or to receive electrical signals from touch sensing grid 142. Preferably, tamper sensing circuitry 148 is configured to send electrical signals to and/or to receive electrical signals from tamper sensing grid 146.

Preferably disposed over the patterned conductive layer 140 is a protective covering layer 150. Preferably disposed over protective covering layer 150 is an electrical insulative layer 160. Preferably disposed over insulative layer 160 is a protective covering layer 170.

Disposed above protective covering layer 170 is a top substrate 180. Preferably formed onto a lower surface of top substrate 180 is a patterned conductive layer 190, preferably formed of Indium Tin Oxide (ITO), but alternatively formed of any other suitable material.

Preferably, the patterned conductive layer 190 includes, as shown in FIG. 1, both a touch sensing grid 192, electrically coupled to touch sensing circuitry 144, and a tamper sensing grid 196, coupled to tamper sensing circuitry 148. The touch sensing grid 192 and the tamper sensing grid 196 preferably do not physically contact each other. In some of the various alternative embodiments, some of which are described herein below with reference to FIGS. 2A, 2B and 2C, the patterned conductive layer 190 may include only a single grid. The patterned conductive layer 190 is preferably coupled to touch sensing circuitry 144 and to tamper sensing circuitry 148 via conductive pads 197, some of which may also function, together with similar conductive pads on other patterned conductive layers on other substrates, as case-open switches, which may also be electrically coupled to tamper sensing circuitry 148.

Preferably, touch sensing circuitry 144 is configured to send electrical signals to and/or to receive electrical signals from touch sensing grid 192. Preferably, tamper sensing circuitry 148 is configured to send electrical signals to and/or to receive electrical signals from tamper sensing grid 196.

Preferably disposed over patterned conductive layer 190 is an optional top protective covering layer 198.

Tamper sensing circuitry 148 may detect a change in conductivity of tamper sensing grid 146 and/or tamper sensing grid 196. For example, tamper sensing circuitry 148 may detect tamper sensing grid 146 or tamper sensing grid 196 becoming an open circuit (indicating a break in tamper sensing grid 146 or tamper sensing grid 196), being shorted, or being disconnected. In one embodiment, other changes or fluctuations in conductivity may be detected as is necessary and/or desired.

It is appreciated that in various alternative embodiments, some of which are described herein below with reference to FIGS. 2A, 2B and 2C, a greater number of patterned conductive layers may be provided. It is also appreciated that in various alternative embodiments, some of which are described herein below with reference to some of FIGS. 2A, 2B and 2C, protective covering layers, such as layers 150 and 170, may be patterned.

Reference is now made to FIG. 2A, which is a simplified, partially sectional, partially planar, illustration of one embodiment of a secure touchscreen, which corresponds generally to the embodiment illustrated in FIG. 1. The various elements of the embodiment of FIG. 2A are identified by the same reference numerals used in FIG. 1.

FIG. 2A additionally shows that the patterned conductive layer 140 includes touch sensing grid 142 and tamper sensing grid 146, which may be formed on the same surface of substrate 130 and do not make physical contact with each other. FIG. 2A also shows that protective covering layer 150 is patterned to only expose the touch sensing grid 142 to the electrical insulative layer 160. In one embodiment, tamper sensing grid 146 may be disposed in areas that touch sensing grid 142 is not present.

FIG. 2A further shows that the patterned conductive layer 190 includes touch sensing grid 192 and tamper sensing grid 196, which may be formed on the same surface of substrate 180 and do not physically contact each other. FIG. 2A also shows that protective covering layer 170 is patterned to only expose the touch sensing grid 192 to the electrical insulative layer 160. In one embodiment, tamper sensing grid 196 may be disposed in areas that touch sensing grid 192 is not present.

Figure 2B:
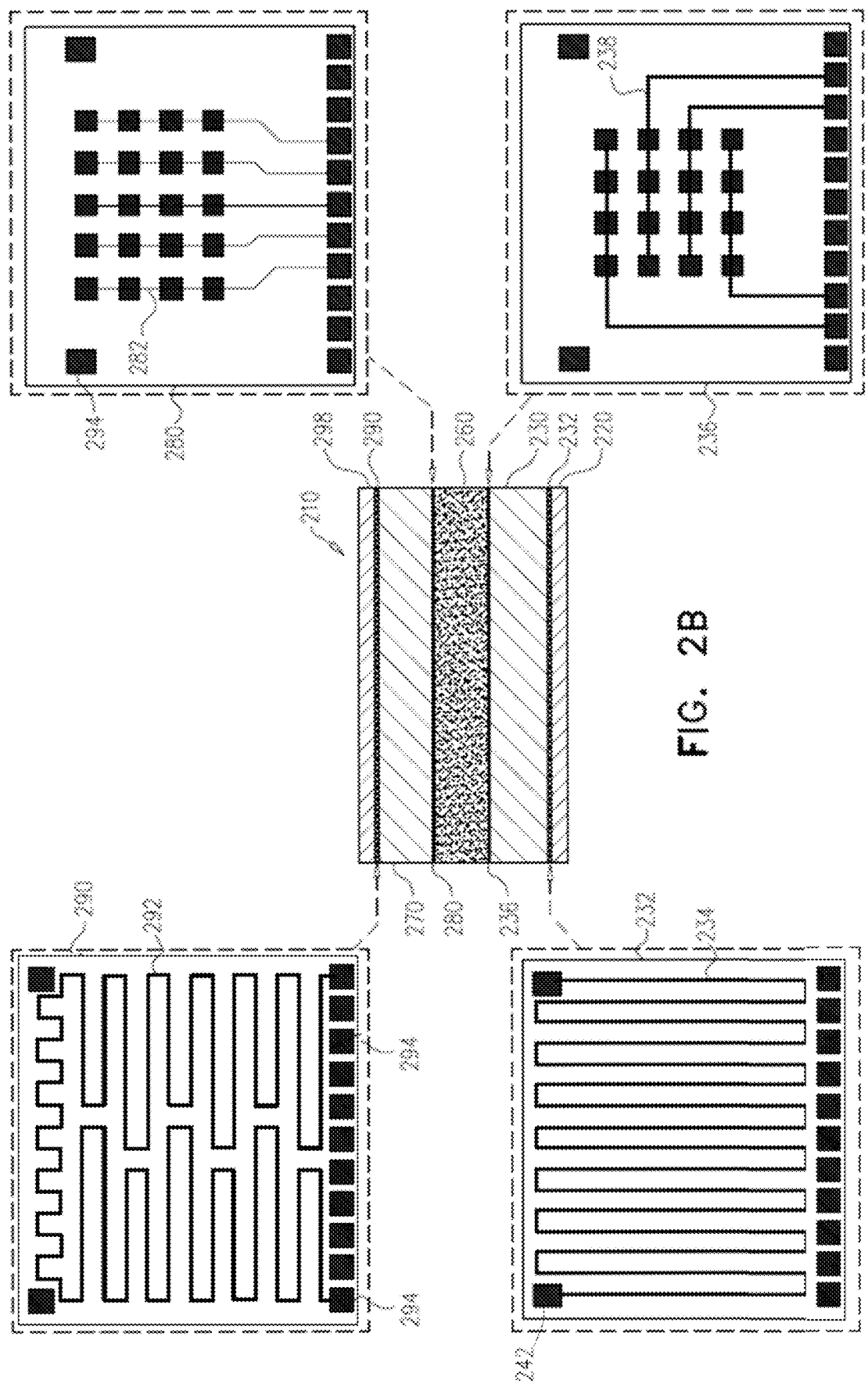
FIG. 2B is a simplified, partially sectional, partially planar, illustration of another embodiment of a secure touchscreen of the general type illustrated in FIG. 1.

Reference is now made to FIG. 2B, which is a simplified, partially sectional, partially planar, illustration of another embodiment of a secure touchscreen assembly 210, which corresponds generally to the embodiment illustrated in FIG. 1 but includes a total of four patterned conductive layers, two patterned conductive layers being formed on respective top and bottom surfaces of each substrate.

Secure touch screen assembly 210 preferably comprises an optional bottom protective covering layer 220. Disposed above bottom protective covering layer 220 is a bottom substrate 230.

Preferably formed onto a lower surface of bottom substrate 230 is a patterned conductive layer 232, preferably formed of Indium Tin Oxide (ITO), but alternatively formed of any other suitable material. Preferably, the patterned conductive layer 232 includes a tamper sensing grid 234.

Preferably formed onto an upper surface of bottom substrate 230 is a patterned conductive layer 236, preferably formed of Indium Tin Oxide (ITO), but alternatively formed of any other suitable material. Preferably, the patterned conductive layer 236 includes a touch sensing grid 238.

The tamper sensing grid 234 is preferably coupled to tamper sensing circuitry 148 (FIG. 1) via conductive pads 242 some of which may also function, together with similar conductive pads on other patterned conductive layers, as case-open switches, which may also be electrically coupled to tamper sensing circuitry 148.

Preferably, touch sensing circuitry 144 (FIG. 1) is configured to send electrical signals to and/or to receive electrical signals from touch sensing grid 238. Preferably, tamper sensing circuitry 148 is configured to send electrical signals to and/or to receive electrical signals from tamper sensing grid 234.

Preferably disposed over the patterned conductive layer 236 is an electrical insulative layer 260.

Disposed above electrical insulative layer 260 is a top substrate 270. Preferably formed onto a lower surface of top substrate 270 is a patterned conductive layer 280, preferably formed of Indium Tin Oxide (ITO), but alternatively formed of any other suitable material. Preferably, the patterned conductive layer 280 includes a touch sensing grid 282.

Preferably formed onto an upper surface of bottom substrate 230 is a patterned conductive layer 290, preferably formed of Indium Tin Oxide (ITO), but alternatively formed of any other suitable material. Preferably, the patterned conductive layer 290 includes a tamper sensing grid 292.

The tamper sensing grid 292 is preferably coupled to tamper sensing circuitry 148 (FIG. 1) via conductive pads 294 some of which may also function, together with similar conductive pads on other patterned conductive layers, as case-open switches, which may also be electrically coupled to tamper sensing circuitry 148.

Preferably, touch sensing circuitry 144 is configured to send electrical signals to and/or to receive electrical signals from touch sensing grid 282. Preferably, tamper sensing circuitry 148 is configured to send electrical signals to and/or to receive electrical signals from tamper sensing grid 292.

Preferably disposed over patterned conductive layer 290 is an optional top protective covering layer 298.

Figure 2C:
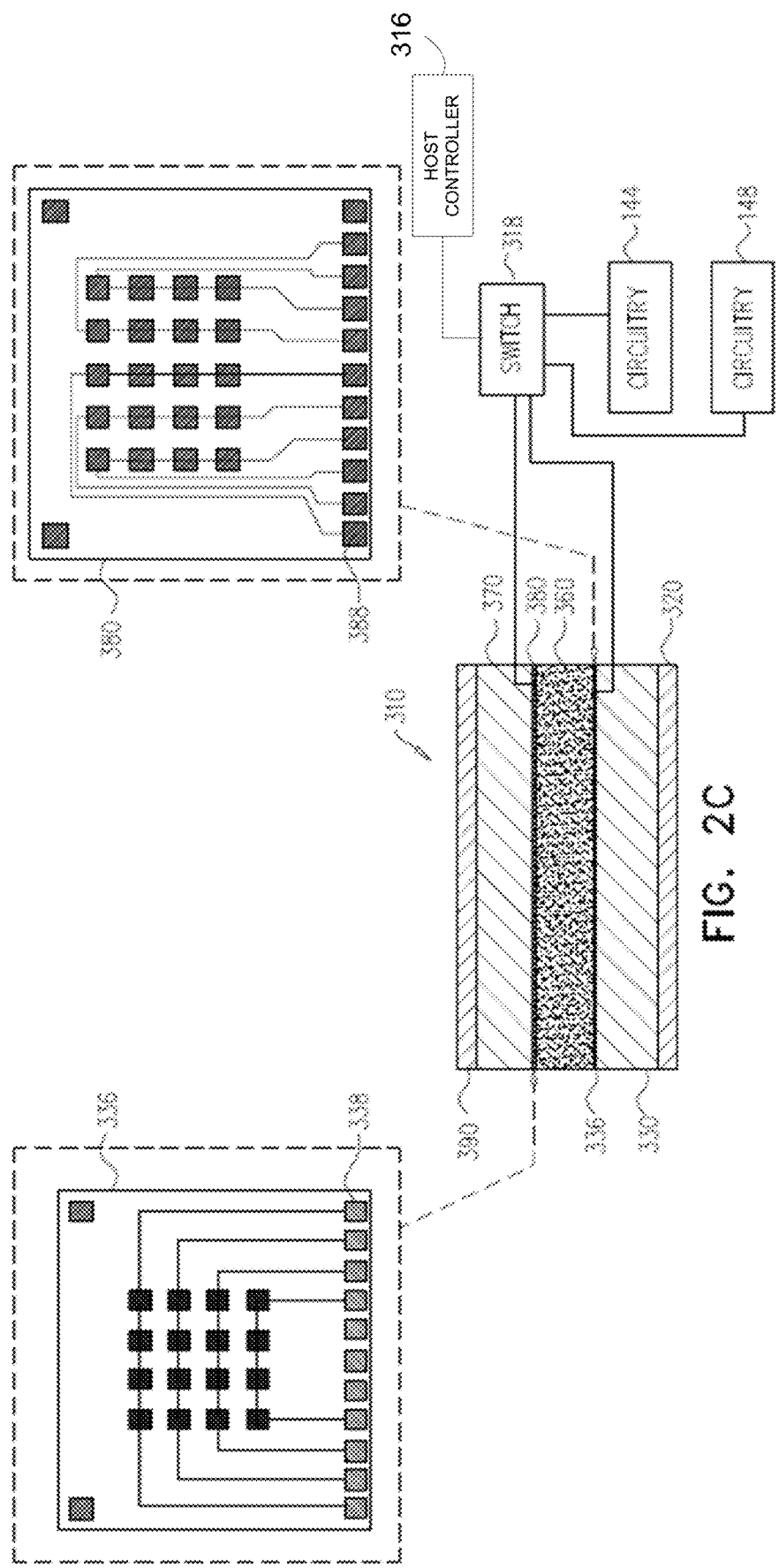
FIG. 2C is a simplified, partially sectional, partially planar, illustration of a further embodiment of a secure touchscreen of the general type illustrated in FIG. 1.

Reference is now made to FIG. 2C, which is a simplified, partially sectional, partially planar, illustration of yet another embodiment of a secure touchscreen assembly 310, which corresponds generally to the embodiment illustrated in FIG. 1 but includes only two grids, both of which may together function at different times as touch sensing grids and tamper sensing grids in response to the operative position of a switch 318.

Secure touch screen assembly 310 preferably comprises an optional bottom protective covering layer 320. Disposed above bottom protective covering layer 320 is a bottom substrate 330.

Preferably formed onto an upper surface of bottom substrate 330 is a patterned conductive layer 336, preferably formed of Indium Tin Oxide (ITO), but alternatively formed of any other suitable material. Preferably, the patterned conductive layer 336 is configured to function as either touch sensing grid or as a tamper sensing grid depending on the operative orientation of switch 318.

In one embodiment, patterned conductive layer 336 may include a plurality of traces 332, and each end of each trace 332 may be coupled to a conductive pad 338.

Patterned conductive layer 336 is preferably coupled to switch 318 and thus to touch sensing circuitry 144 and tamper sensing circuitry 148 (FIG. 1) via conductive pads 338.

Preferably, one of touch sensing circuitry 144 and tamper sensing circuitry 148 is configured to send electrical signals to and/or to receive electrical signals from patterned conductive layer 336, based on the operative orientation of switch 318.

Preferably disposed over the patterned conductive layer 336 is an electrical insulative layer 360.

Disposed above electrical insulative layer 360 is a top substrate 370. Preferably formed onto a lower surface of top substrate 370 is a patterned conductive layer 380, preferably formed of Indium Tin Oxide (ITO), but alternatively formed of any other suitable material. Preferably, the patterned conductive layer 380 is configured to function as either touch sensing grid or as a tamper sensing grid depending on the operative orientation of switch 318.

In one embodiment, patterned conductive layer 380 may include a plurality of traces 382, and each end of each trace 382 may be coupled to a conductive pad 388.

Patterned conductive layer 380 is preferably coupled to switch 318 and thus to touch sensing circuitry 144 and tamper sensing circuitry 148 (FIG. 1) via conductive pads 388.

Preferably disposed over patterned conductive layer 380 is an optional top protective covering layer 390.

Preferably, one of touch sensing circuitry 144 and tamper sensing circuitry 148 is configured to send electrical signals to and/or to receive electrical signals from patterned conductive layer 380, based on the operative orientation of switch 318. In one embodiment, switch 318 may be controlled by a host controller 316 that may comprise a microprocessor, microcontroller, etc.

Switch 318 may include one or more switches.

In one embodiment, switch 318 may configure each trace 332, 382 to sense a touch or to sense a tamper. When configured to sense a touch, switch 318 may electrically couple one conductive pad 338, 388 for each trace 332, 382, while leaving the other conductive pad 338, 388 floating. When configured to sense a tamper, switch 318 may electrically couple both conductive pads 338, 388 for at least one of traces 332, 382 so that the conductivity of at least one of traces 332, 382 may be determined.

In one embodiment, one or more tamper sensing grid (not shown) such as that depicted in FIG. 2A may be included in the embodiment of FIG. 2C to provide additional tamper detection. In one embodiment, tamper sensing grid (not shown) may be provided in on each patterned conductive layer 336 and 380 in areas that the respective touch sensing grid is not present.

Figure 3:
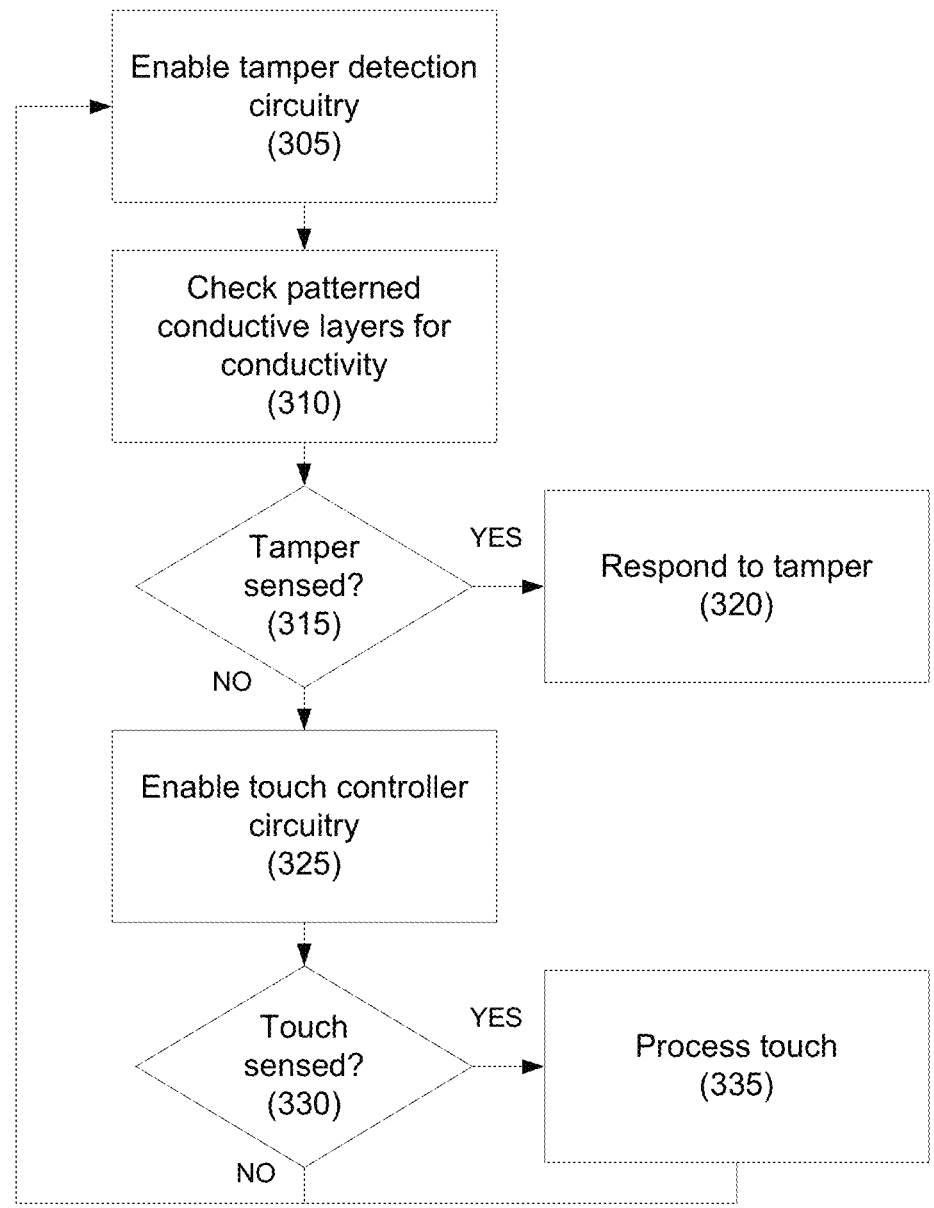
FIG. 3 illustrates an exemplary method for combined tamper detection and touch detection for a touchscreen assembly.

Reference is now made to FIG. 3, which depicts a method for combined tamper detection and touch detection according to one embodiment. In one embodiment, circuitry similar to that described with reference to FIG. 2C may be used.

In one embodiment, in step 305, a host controller may cause the switch to configure that the patterned conductive layers to sense a tamper. In one embodiment, the switch may electrically couple the conductive pads of the traces in the patterned conductive layer to tamper detection circuitry so that the conductivity of each trace may be determined.

In one embodiment, fewer than all traces may be used to detect a tamper.

In step 310, the tamper detection circuitry may check the traces for open circuits, short circuits, or changes in conductivity from a prior measurement.

If, in step 315, an open circuit, short circuit, or change in conductivity above a threshold is detected, in step 320, a tamper is detected. In one embodiment, the host controller may detect the tamper and may take any action as necessary and/or desired, including automatically erasing sensitive information (e.g., encryption keys) from memory, shutting down the device, etc.

Any suitable action may be taken as is necessary and/or desired.

In step 325, the host controller may cause the switch to configure that the patterned conductive layers to sense a touch. In one embodiment, the switch may electrically couple only one conductive pad of the traces in the patterned conductive layer to touch sensing circuitry so that, for example, a change in capacitance may be sensed.

If, in step 330, a touch is sensed, in step 335, the touch may be processed. If a touch is not sensed, the process may return to step 305.

It will be appreciated by persons skilled in the art that the present invention is not limited to what has been particularly shown and described hereinabove. Rather the scope of the present invention includes both combinations and subcombinations of the features described hereinabove as well as variations thereof which are not in the prior art.

What is claimed is:

1. A secure touchscreen assembly comprising:
a first patterned conductive layer comprising a plurality of first traces, each first trace comprising a conductive pad at each end;
a second patterned conductive layer comprising a plurality of second traces, each second trace comprising a conductive pad at each end;
tamper sensing circuitry that detects a tamper by detecting a change in conductivity in one of the traces in the first patterned conductive layer and the second patterned conductive layer;
touch sensing circuitry that detects a touch; and
a switch that selectably electrically couples the tamper sensing circuitry to the conductive pads for at least one of the plurality of first traces and the plurality of second traces, or electrically couples the touch sensing circuitry to one of the conductive pads for each of the plurality of first traces and the plurality of second traces at a given time.

2. The secure touchscreen assembly of claim 1, wherein the conductive pad for each of the plurality of first traces and the plurality of second traces that is not electrically coupled to the touch sensing circuitry floats when the switch electrically couples the touch sensing circuitry to one of the conductive pads for each of the plurality of first traces and the plurality of second traces.

3. The secure touchscreen of claim 1, wherein the change in conductivity comprises one of an open circuit and a short circuit.

4. The secure touchscreen of claim 1, wherein the first patterned conductive layer further comprises a first tamper sensing grid that is disposed in areas of the first conductive layer where the plurality of first traces are not present and is not in physical contact with the plurality of first traces; and
wherein the touch sensing circuitry is coupled to the first tamper sensing grid and further detects the tamper by detecting a change in conductivity in the first tamper sensing grid.

5. The secure touchscreen of claim 4, wherein the second patterned conductive layer further comprises a second tamper sensing grid that is disposed in areas of the second conductive layer where the plurality of second traces are not present and is not in physical contact with the plurality of second traces; and
wherein the touch sensing circuitry is coupled to the second tamper sensing grid and further detects the tamper by detecting a change in conductivity in the second tamper sensing grid.

6. The secure touchscreen of claim 1, further comprising:
an electrically insulative layer disposed between the first patterned conductive layer and the second patterned conductive layer.

7. A secure touchscreen assembly comprising:
a first patterned conductive layer comprising a plurality of first traces, each first trace comprising a conductive pad at each end;
a second patterned conductive layer comprising a plurality of second traces, each second trace comprising a conductive pad at each end;
tamper sensing circuitry that detects a tamper by detecting a change in conductivity in one of the plurality of first traces or in one of the plurality of second traces;
touch sensing circuitry that detects a touch; and
a switch that selectably electrically couples the tamper sensing circuitry to the conductive pads for at least one of the plurality of first traces and the plurality of second traces, or electrically couples the touch sensing circuitry to one of the conductive pads for each of the plurality of first traces and the plurality of second traces at a given time;
wherein when the tamper sensing circuitry is electrically coupled to the conductive pads for at least one of the plurality of first traces and a change in conductivity is detected in one of the plurality of first traces, the tamper sensing circuitry detects a tamper; and wherein when the tamper sensing circuitry is electrically coupled to the conductive pads for at least one of the plurality of second traces and a change in conductivity is detected in one of the plurality of second traces, the tamper sensing circuitry detects a tamper.

8. The secure touchscreen assembly of claim 7, wherein the conductive pad for each of the plurality of first traces and the plurality of second traces that is not electrically coupled to the touch sensing circuitry floats when the switch electrically couples the touch sensing circuitry to one of the conductive pads for each of the plurality of first traces and the plurality of second traces.

9. The secure touchscreen of claim 7, wherein the change in conductivity comprises one of an open circuit and a short circuit.

10. The secure touchscreen of claim 7, wherein the first patterned conductive layer further comprises a first tamper sensing grid that is disposed in areas of the first conductive layer where the plurality of first traces are not present and is not in physical contact with the plurality of first traces; and wherein the touch sensing circuitry is coupled to the first tamper sensing grid and further detects the tamper by detecting a change in conductivity in the first tamper sensing grid.

11. The secure touchscreen of claim 10, wherein the second patterned conductive layer further comprises a second tamper sensing grid that is disposed in areas of the second conductive layer where the plurality of second traces are not present and is not in physical contact with the plurality of second traces; and wherein the touch sensing circuitry is coupled to the second tamper sensing grid and further detects the tamper by detecting a change in conductivity in the second tamper sensing grid.

12. The secure touchscreen of claim 7, further comprising:

an electrically insulative layer disposed between the first patterned conductive layer and the second patterned conductive layer.

* * * * *